United States Patent
Crowell

[11] Patent Number: 5,990,595
[45] Date of Patent: *Nov. 23, 1999

[54] ROTORS AND METHODS OF MANUFACTURING SUCH ROTORS

[75] Inventor: James Robert Crowell, Huntertown, Ind.

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/725,860

[22] Filed: Oct. 4, 1996

[51] Int. Cl.$^6$ .............................. H02K 17/16; H02K 1/22
[52] U.S. Cl. ........................... 310/261; 310/211; 310/216
[58] Field of Search .................... 310/261, 262, 310/265, 211, 212, 216, 217, 218

[56] References Cited

U.S. PATENT DOCUMENTS

| | | | |
|---|---|---|---|
| 2,944,171 | 7/1960 | Alger | 310/211 |
| 2,956,186 | 10/1960 | Wall | 310/65 |
| 3,083,313 | 3/1963 | Boles | 310/211 |
| 3,213,306 | 10/1965 | Summers et al. | 310/211 |
| 3,237,033 | 2/1966 | Glass et al. | 310/211 |
| 3,597,646 | 8/1971 | Lawrenson | 310/166 |
| 4,499,660 | 2/1985 | Lenz | 29/598 |
| 5,049,771 | 9/1991 | Challita et al. | 310/219 |
| 5,182,483 | 1/1993 | Hibino et al. | 310/211 |
| 5,191,309 | 3/1993 | Laros | 310/261 |
| 5,498,918 | 3/1996 | Weihrauch | 310/261 |

FOREIGN PATENT DOCUMENTS

| | | | |
|---|---|---|---|
| 54-8805 | 1/1979 | Japan | 310/211 |

Primary Examiner—Nestor Ramirez
Assistant Examiner—Burt Mullins
Attorney, Agent, or Firm—Carl B. Horton, Esq.; Damian G. Wasserbauer, Esq.

[57] ABSTRACT

Rotors and methods of assembling such rotors for electric motors are described. In one embodiment, the rotor includes a substantially cylindrical core having substantially planar first and second end surfaces and a substantially cylindrical body portion. The rotor core body portion has first, second and third body sections. The first body section has an outer diameter less than an outer diameter of the second body section, and the third body section has an outer diameter approximately about equal to the outer diameter of the first body section. The first and third body sections sometimes are referred to as end sections or core extensions. A plurality of radially arranged rotor bar slots extend through the body portion, and a plurality of rotor bars are cast in the rotor bar slots. The rotor bar slots in the end sections have a first geometric cross-sectional shape and the rotor bar slots in the second body section have a second geometric cross-sectional shape. The rotor bar slot geometry in the end sections is selected to allow outward displacement of the rotor bars in the radial direction.

19 Claims, 4 Drawing Sheets

ROTORS AND METHODS OF MANUFACTURING SUCH ROTORS

FIELD TO THE INVENTION

This invention relates generally to dynamoelectric machines and, more particularly, to rotors for electric motors and methods of manufacturing such rotors.

BACKGROUND OF THE INVENTION

A dynamoelectric machine, such as an AC induction motor, typically includes a rotor core which, in one known form, has opposed substantially planar end surfaces and a substantially cylindrical, longitudinally extending body portion. The rotor core also has a rotor shaft bore and a plurality of rotor bar slots. The rotor bar slots sometimes are referred to as secondary conductor slots.

The above described rotor core typically is formed by a plurality of steel laminations. More specifically, each lamination is stamped from a steel sheet, and has a central opening and a plurality of spaced, radially arranged openings adjacent the lamination outer periphery. The laminations are arranged in a stack so that the openings at the outer periphery of the laminations are aligned to form rotor bar slots and the central openings are aligned to form the rotor shaft bore.

To complete the rotor formation process for a standard cast aluminum type rotor, rotor bars are cast in the rotor bar slots and end rings are cast at the opposing ends of the core using, for example, an aluminum casting process. The rotor bars typically extend through the slots and the end rings "short" the bars together at the ends of the rotor core. A rotor shaft extends into the rotor shaft bore and is secured to the rotor core by any suitable process, such as, for example, interference fit or keying. Such a rotor sometimes is referred to in the art as a "squirrel cage" type rotor.

The above described cast aluminum type rotor provides many advantages including low cost and simplicity. Limitations of the cast aluminum type rotor, particularly for larger motors, are associated with operation at high temperatures and/or at high speeds, due for example to differential dimensional growth between the steel rotor core and the aluminum rotor bars and end rings. More specifically, as the rotor temperature and/or speed increases, the steel rotor core expands radially at a rate and to an extent different from the expansion rate and extent of the aluminum rotor bars and end rings. This differential radial expansion results in stresses on the rotor. One high stress region of particular concern is the interface region between the rotor end rings and the rotor bars at the outermost steel core lamination. If the stresses become substantial, it is possible that end rings could break away from the rotor bars and the rotor could fail, or at least operate less efficiently than desired.

Further, to operate a cast aluminum type rotor at a high temperature and/or a high speed, the rotor components typically must be sufficiently large to withstand high thermal and centrifugal stresses. Of course, increasing the size of the rotor for increased strength reasons increases motor cost since more material is required. In addition, since a larger rotor also typically is more massive than a smaller rotor, the affects of centrifugal forces and thermal forces are increased, thus offsetting many of the benefits of the larger rotor.

A known alternative construction to the cast aluminum type rotor is generally referred to as a fabricated bar type rotor. The rotor core in a fabricated bar rotor is substantially the same as the rotor core in a cast aluminum rotor. The rotor bar slots in a fabricated bar rotor core, however, generally have more simple geometric shapes, e.g., rectangular, than the geometric shapes of the rotor bar slots in a cast aluminum rotor. In the fabricated bar rotor, extruded bars (typically aluminum, copper, or bronze) are inserted through the rotor bar slots and the bars extend from the ends of the rotor core. End rings are then brazed or welded to respective ends of the bars and "short" the bars together. Since the bars extend from the ends of the rotor core, the end rings are spaced from the rotor core ends.

It is believed that a rotor with bar extensions can be operated at higher temperatures and/or speeds than a similar size and material rotor without bar extensions since the bar extensions allow a redistribution of stresses resulting in lower peak, or maximum, stresses at higher temperatures and/or speeds. Specifically, it is believed that because of the bar extensions, the bars are able to flex slightly between the core laminations and the end rings, which results in a redistribution of stresses and strains and lower peak or maximum stresses in the bars and end rings.

Although a fabricated bar rotor may provide the advantages as explained above, such a rotor has several limitations. For example, in a fabricated bar rotor core, simple geometric shapes are required in order to ensure that the extruded bar can be inserted within the rotor bar slots. Generally, however, the geometric shape of the rotor bar slots affects the electromagnetic characteristics of a rotor including starting torque, starting amps, efficiency, and power factor. By limiting the rotor bar slots to simple geometric shapes, less flexibility is afforded a designer in attempting to design rotor bar slots to satisfy certain rotor operating characteristics or parameters. In addition, in order to insert the extruded bars into the slots, the extruded bars must have a smaller cross-sectional area than the cross-sectional area of the slots in the core. As a result, the extruded bars may be loosely fitted in the slots and during operation, the bars may vibrate, which could lead to failure of the fabricated rotor. Also, in fabricated bar rotors, the rotor laminations must be clamped or interlocked together, which adds extra process steps in the rotor manufacture process. Further, tradeoffs are associated with the materials commonly selected for the rotor bars in a fabricated bar rotor. For example, high conductivity aluminum can be easily cast but is difficult to weld or braze, and high strength copper alloys often lose considerable strength during brazing/welding operations. Fabricated bar rotors also are expensive to manufacture, in terms of both labor and material, especially when compared to costs associated with cast aluminum type rotors.

It would be desirable to provide a rotor having the cost advantages of a cast aluminum rotor with the increased temperature and speed operation ranges of a fabricated bar type rotor. It also would be desirable to provide such a rotor which allows a designer to select complex geometric shape rotor bar slots so that desired electromagnetic characteristics can be achieved.

An object of the present invention is to provide a rotor having increased temperature and speed operational ranges as compared to a similar size cast aluminum rotor.

Another object of the present invention is to provide such a rotor at a lower cost than a fabricated bar rotor having similar temperature and speed operation ranges.

Yet another object of the present invention is to provide such a rotor which is more easily manufactured than fabricated bar rotors.

SUMMARY OF THE INVENTION

These and other objects may be attained by a rotor which, in one embodiment, includes a substantially cylindrical core having axially spaced apart first and second ends and a substantially cylindrical body portion between the ends. The rotor core body portion has a main body section extending between respective end sections. As described below in more detail, the laminations of the rotor core main body section are different from the laminations of the end sections.

Specifically, and in one embodiment, the radially arranged openings in the laminations of the end sections have a first geometric shape and the radially arranged openings in the laminations of the main body section have a second geometric shape. As a result, the portions of the rotor bar slots formed by the laminations of the end sections have a different geometric shape than the portions of the rotor bar slots formed by the laminations of the main body section.

To fabricate the rotor core, the laminations are stacked so that the laminations having the first geometric shape radial openings form the end sections and the laminations having the second geometric shape radial openings form the main body section. The radial openings are aligned to form rotor bar slots. Rotor bars are then cast in the rotor bar slots, and first and second aluminum end rings are cast at the first and second ends of the rotor core. The end rings are electrically connected to the rotor bars.

To allow low stress radial displacement of the rotor bars and end rings, the rotor core end sections are machined so that at the core end sections, an outermost surface of each rotor bar is exposed and can expand radially outward beyond the outer periphery of the rotor core end sections. The end sections are sometimes referred to herein as core extensions.

In the one embodiment, the rotor bars in the core end sections have a first geometric cross-sectional shape and the rotor bars in the main body section have a second geometric cross-sectional shape. The main body section rotor bars have a complex shape so that the desired rotor electromagnetic operating characteristics are achieved. The rotor bars in the end sections have a more simple shape to provide stress and strain distribution between the main body slots and the end rings, and to provide sufficient strength to partially support the end rings under operating stresses.

The above described rotor is believed to have the cost advantages of a cast aluminum rotor and yet is able to operate at the higher temperature and speed ranges. The core extensions facilitate reducing stresses in the rotor by allowing radial displacement of the rotor bars and the end rings beyond the core extensions thus reducing, or redistributing, stresses due to differential expansion of the steel core and the aluminum bars and end rings. More specifically, the portions of the rotor bars in the end sections are more flexible than the portions of the rotor bars in the main body section. Also, since the aluminum casting process is used to form the rotor bars, at least the portions of the rotor bar slots in the core main body section can have complex geometric shapes so that desired electromagnetic characteristics can be achieved. Further, since steel lamination material is used in the core extensions, such "active" steel contributes to rotor efficiency and provides a lower operational temperature rise as compared to fabricated bar type rotors in which the bar extensions are not surrounded by steel, i.e., the bar extensions are in air.

The above described rotor, therefore, is believed to provide increased temperature and speed operational ranges as compared to a similar size cast aluminum rotor. These increased ranges are achieved at a lower cost as compared to the cost of a fabricated bar rotor having similar temperature and speed operation ranges. Alternative rotor embodiments which provide similar advantages are described below.

DETAILED DESCRIPTION

Figure 1:
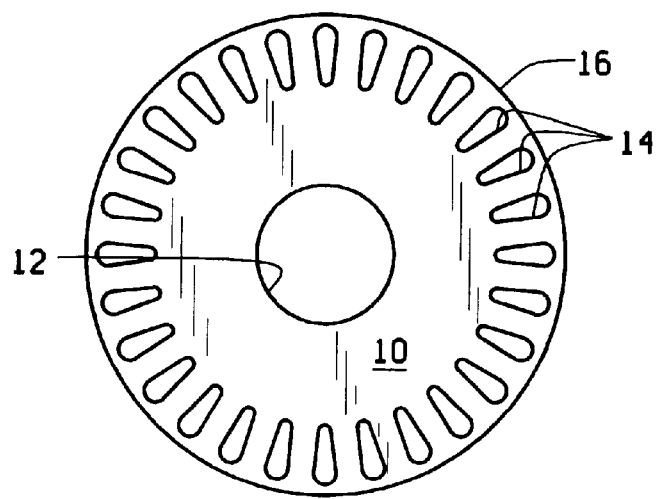
FIG. 1 is a plan view of a rotor lamination.

FIG. 1 is a top view of a rotor lamination 10. Lamination 10, for example, is stamped from a sheet of steel (not shown) and has a generally circular shape. Lamination 10 includes a central rotor shaft opening 12 and a plurality of spaced and radially arranged openings 14 adjacent an outer periphery 16 of lamination 10.

Figure 2:
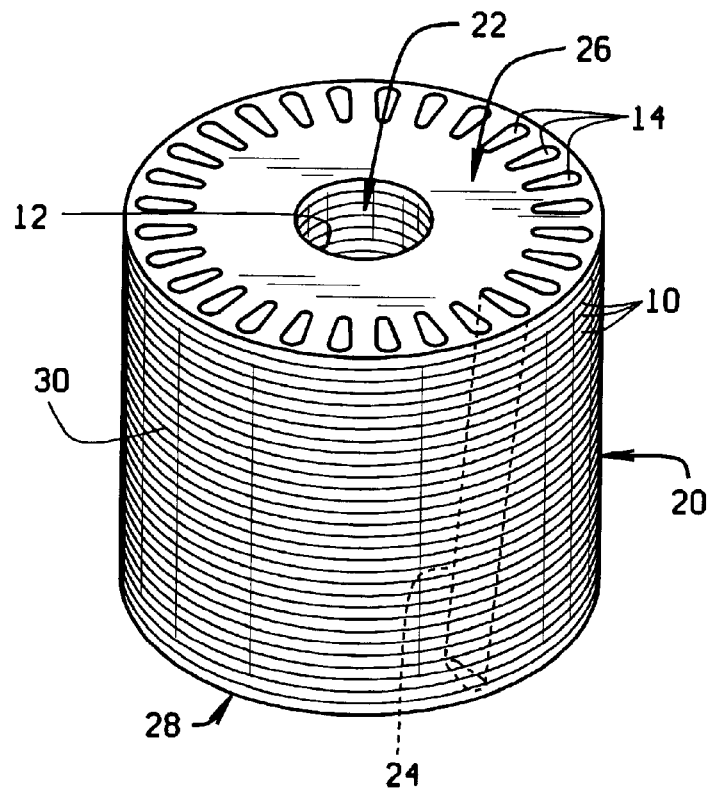
FIG. 2 is a perspective view of a rotor core.

FIG. 2 is a perspective view of a rotor core 20 formed by stacking a plurality of laminations 10 to a selected height. Each rotor shaft opening 12 of each lamination 10 is coaxially aligned with all other rotor shaft openings 12 of all other lamination 10 of core 20 to form rotor shaft bore 22. Radially arranged openings 14 of each lamination 10 are aligned, but may be slightly skewed, to form rotor bar slots 24.

Rotor core 20 has opposed, substantially planar end surfaces 26 and 28. Core 20 also has a substantially cylindrical, longitudinally extending body portion 30.

Rotor core 20 is typically referred to as a "closed slot" type rotor core because slots 24 are not open at outer periphery 16 of laminations 10. For an "open slot" type rotor core, slots 24 would be open at outer periphery 16 of laminations 10.

Figure 3:
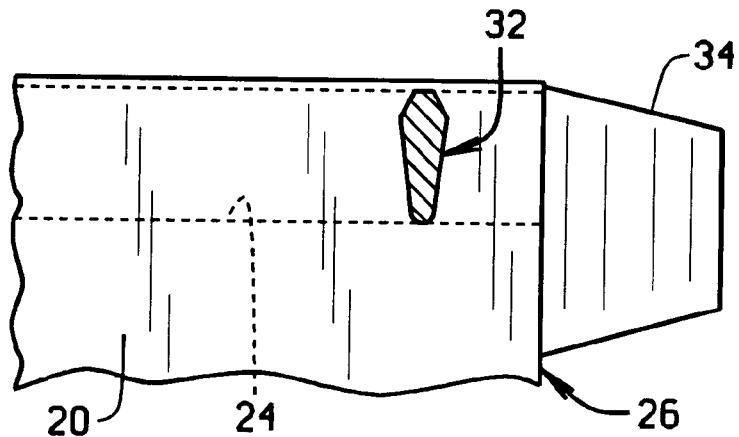
FIG. 3 illustrates a section of a prior art cast aluminum rotor.

Referring to FIG. 3, and to complete the standard cast aluminum type rotor formation process using rotor core 20, rotor bars 32 are cast in rotor bar slots 24 and end rings 34 are cast at opposing ends 26 and 28 (only end 26 is shown in FIG. 3) of core 20. Rotor bars 32 extend through slots 24 and end rings 34 "short" bars 32 together at ends 26 and 28 of rotor core 20. A rotor shaft (not shown) extends into rotor shaft bore 22 (FIG. 2) and is secured, e.g., interference fit or keyed, to rotor core 20. Such a rotor sometimes is referred to in the art as a "squirrel cage" type rotor.

A cross-section view of one rotor bar 32 is superimposed on FIG. 3 at 32 to illustrate the complex geometric shape of rotor bar 32. The cross-sectional shape of rotor bar 32 affects the electromagnetic characteristics of rotor 20 including starting torque, starting amps, efficiency, and power factor. The rotor bar cross-sectional shape illustrated in FIG. 3 is by way of example only, and in a cast aluminum type rotor, rotor bars 32 may have many alternative geometric cross-sectional shapes.

Rotor core 20 provides many advantages including low cost and simplicity. Rotor core 20, however, does not efficiently operate at high temperatures and at high speeds, primarily due to differential expansion of steel rotor core 20 and aluminum rotor bars 32 and end rings 34.

Figure 4:
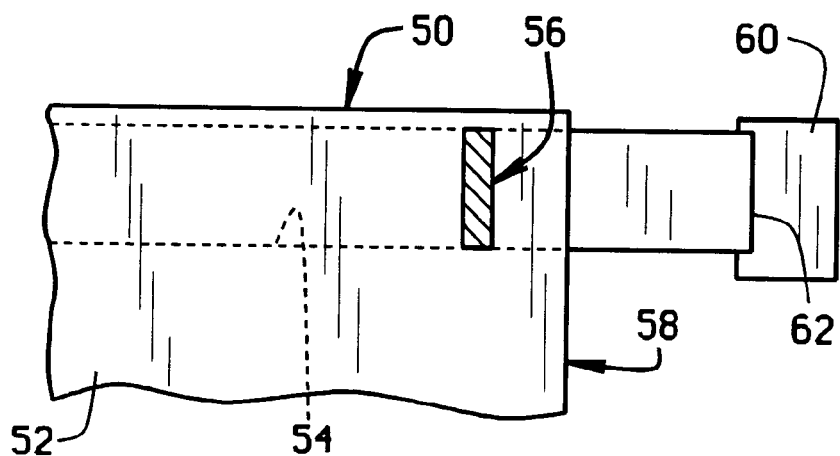
FIG. 4 illustrates a section of a prior art fabricated bar rotor.

FIG. 4 illustrates a section of a rotor 50 generally known in the art as a fabricated bar type rotor. Rotor 50 includes a rotor core 52 having a plurality of radially located rotor bar slots 54. Extruded bars 56 are located in slots 54. Bars 56 generally have more simple geometric cross-sectional shapes, e.g., rectangular, than the geometric cross-sectional shapes of the rotor bars in cast aluminum rotors. A cross-section view of one rotor bar 56 is superimposed on FIG. 4 at 56 to illustrate the simple geometric cross-section shape of bar 56. Bars 56 extend from substantially planar end 58 of rotor core 52, and end ring 60 is brazed or welded to respective ends 62 of bars 54 and "shorts" bars 54 together. Since bars 54 extend from end 58 of rotor core 53, end ring 60 is spaced from rotor core end 58. The opposing end (not shown) of core 52 includes an identical ring 60 brazed or welded to the opposing ends (not shown) of bars 54 and is spaced from the rotor core end.

Rotor 50 can be operated at higher temperatures and speeds than a similar size cast aluminum rotor core since rotor 50 generates lower stresses at higher temperatures and speeds. Specifically, by spacing end rings 60 away from ends 58, i.e., the outermost rotor core lamination, the differential expansion between end rings 60 and steel core 52 does not result in as much stress on rotor 50 as with the cast aluminum type rotor.

In fabricated bar rotor 50, however, rotor bars 56 have simple geometric cross sectional shapes in order to ensure that bars 56 can be inserted within slots 54 and in electrical contact with core 52. Limiting rotor bar slots 54 to simple geometric shapes affords less flexibility to a designer in attempting to satisfy desired rotor operating characteristics. In addition, fabricated bar rotors are expensive to manufacture, in terms of both labor and material, especially when compared to costs associated with manufacture of cast aluminum type rotors.

Figure 5:
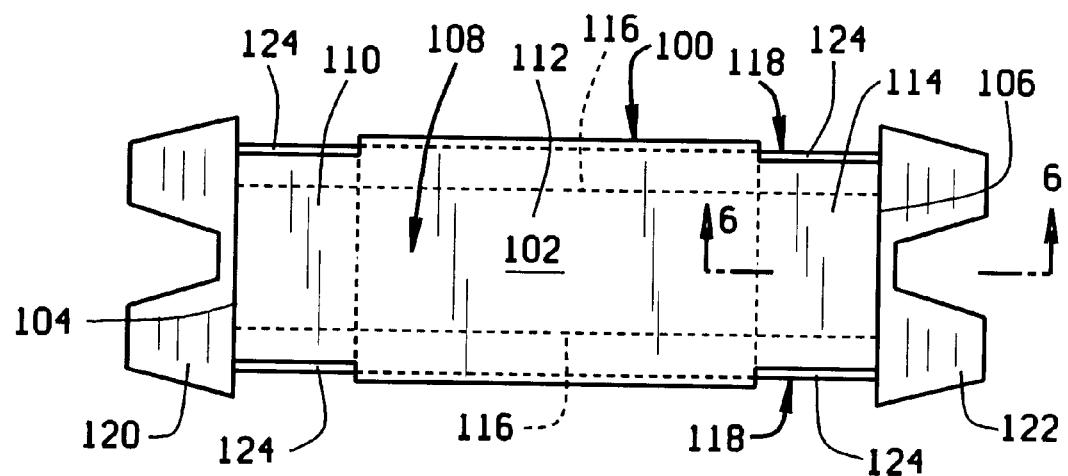
FIG. 5 is a full side view of a rotor in accordance with one embodiment of the present invention.

FIG. 5 is a side view of a rotor 100 constructed in accordance with one embodiment of the present invention. Rotor 100 includes a substantially cylindrical core 102 having substantially planar first and second ends 104 and 106 and a substantially cylindrical body portion 108. Rotor core 102 is constructed of a plurality of steel laminations. Body portion 108 has first, second and third body sections 110, 112 and 114. First body section 110 has an outer diameter less than an outer diameter of second body section 112, and third body section 114 has an outer diameter less than outer diameter of second body section 112. First and third body sections 110 and 114 sometimes are referred to herein as core extensions or end sections. As described below, the laminations of end sections 110 and 114 differ from the laminations of second body section 112.

A plurality of radially located rotor bar slots 116 extend through core 102, and a plurality of rotor bars 118 are cast in rotor bar slots 116. A first aluminum end ring 120 is cast at first end 104 of rotor core 102 and is electrically connected to rotor bars 118. A second aluminum end ring 122 is cast at second end 106 of rotor core 102 and is electrically connected to rotor bars 118. Radial sections 124 of each rotor bar 118 are shown in FIG. 5 as extending radially outward beyond the outer diameter of first and third rotor core sections 110 and 114 to illustrate that sections 124 of bars 118 can expand radially outward beyond the outer periphery of core sections 110 and 114. In addition, first end ring 120 is shown in FIG. 5 as extending beyond the outer diameter of first body section 110, and second end ring 122 is shown in FIG. 5 as extending beyond the outer diameter of third body section 114, to illustrate that end rings 120 and 122 can expand radially outward beyond the outer periphery of core sections 110 and 114. After machining core 102 as described below, end rings 120 and 122 have an outer diameter approximately about equal the outer diameter of end sections 110 and 114, and outer surfaces of bar sections 124 are continuous with the outer periphery of core sections 110 and 114.

Figure 6:
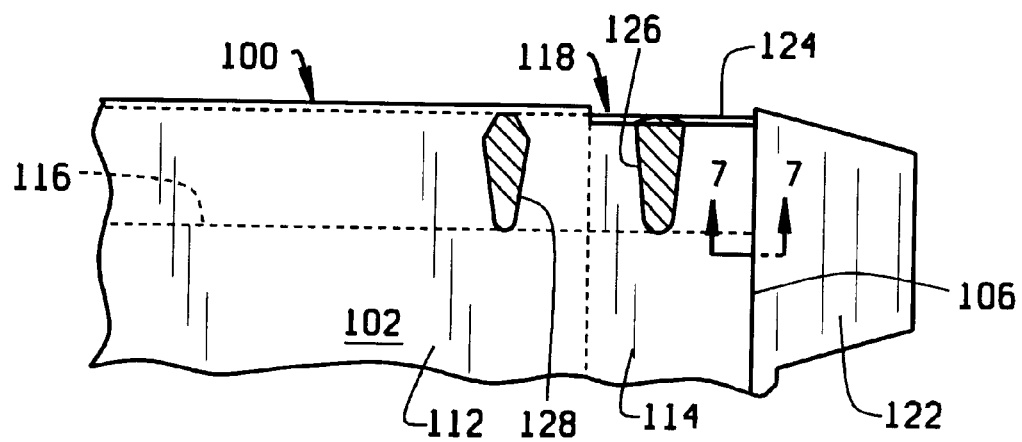
FIG. 6 illustrates a section of the rotor shown in FIG. 5 taken on lines 6—6 shown in FIG. 5.

Referring to FIG. 6, which is a view of rotor 100 taken on line 6—6 shown in FIG. 5, cross-section views of one rotor bar 118 are superimposed at 126 and 128 on FIG. 6 to illustrate the geometric cross-sectional shapes of bar 118. Specifically, since rotor bar slots 116 in end sections 110 and 114 have a first geometric cross-sectional shape 126 and in main body section 112 have a second geometric cross-sectional shape 128, the portions of rotor bars 118 in end sections 110 and 114 have first geometric cross-sectional shape 126 and the portions of rotor bars 118 in main body section 112 have second geometric cross-sectional shape 128. Rotor bar slots 116 in main body section 112 are illustrated as being closed slots. Rotor bar slots 116 in main body section 112 could, alternatively, be open slots.

Figure 7:
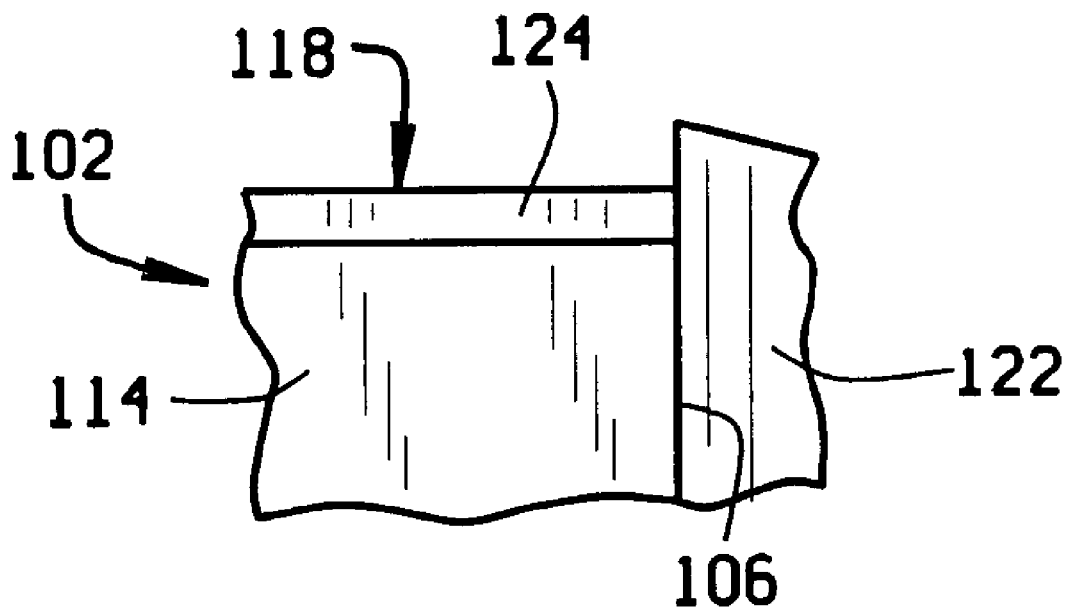
FIG. 7 is an enlarged sectional view taken on lines 7—7 in FIG. 6.

FIG. 7 is an enlarged sectional view taken on lines 7—7 in FIG. 6. As shown in FIG. 7, and as described above, at end section 114, rotor bars 118 may extend radially outward beyond the outer periphery of core 102 at end section 114. In addition, end ring 122 may extend radially outward beyond the outer periphery of core 102. Since rotor bars 118 and end ring 122 may extend radially outward beyond the outer periphery of core 102, stresses due to the differential expansion of the steel laminations of core 102 and aluminum bars 118 and ring 122 are believed to be reduced, particularly at the interface between end ring 122 and bars 118.

With respect to fabricating rotor 100, the fabrication process includes the steps of fabricating substantially cylindrical core 102, injecting molten aluminum, an aluminum alloy, or other castable conductive material, into rotor bar slots 116 to form rotor bars 118 and end rings 120 and 122, and machining end sections 110 and 114 of core 102 so that outer surfaces of bars 118 in end sections 110 and 114 are exposed and free to move outward in the radial direction. Fabricating core 102 includes the steps of coaxially aligning, or stacking, a plurality of laminations. Laminations of core end sections 110 and 114 are selected to have radial openings with the first geometric cross-sectional shape and the laminations of main body section 112 are selected to have radial openings with the second geometric cross-sectional shape. Once the laminations are so arranged, the lamination stack is than positioned in a die and molten aluminum is injected into a die port in flow communication with rotor bar slots 116 formed by the stacked laminations. The die also includes cavities for forming end rings 120 and 122, and when the injected aluminum cools sufficiently, the cast rotor is removed from the die. After the cast aluminum process, lamination material at core end sections 110 and 114 is removed, e.g., using a lathe, so that radial sections 124 of each of rotor bar 118 are exposed and are not constrained in the radial outward direction in the end sections 110 and 114.

Rotor 100 is believed to have the cost advantages of a cast aluminum rotor yet is able to operate at the higher temperature and speed operation ranges of a fabricated copper bar type rotor. More specifically, and with respect to operation, extensions 110 and 114 facilitate reducing, or redistributing, stresses in rotor 100 by allowing radial expansion of rotor bars 118 and end rings 120 and 122 beyond core 102. Peak stresses are believed to be significantly reduced at the core-end ring interfaces in rotor 100 as compared to the stresses at such interfaces in known cast aluminum type rotors.

More particularly, the portions of rotor bars 118 in extensions 110 and 114 can flex more easily than the portions of rotor bars in main body section 112. By increasing the flexibility of the portion of rotor bars 118 in extensions 110 and 114, and in operation, the stresses on rotor core 102 at extensions 110 and 114 is reduced, including a reduction in peak stresses at the core-end ring interfaces as compared to the stresses at such interfaces in known cast aluminum type rotors.

Further, since the aluminum casting process is used to form rotor bars 118, complex geometric shapes can be used for rotor bar slots 116 in main body section 112 so that desired electromagnetic characteristics can be achieved. Such complex geometric shapes, as explained above, typically are not used in fabricated bar type rotors. Also, since steel lamination material is used in extensions 110 and 114, such "active" steel contributes to rotor efficiency and provides a lower operational temperature rise as compared to fabricated bar type rotors in which the bar extensions are not surrounded by steel, i.e., the bar extensions are in air.

The construction of rotor 100, therefore, is believed to provide increased temperature and speed operational ranges as compared to a similar size cast aluminum rotor. These increased operational ranges are achieved by a lower cost rotor than a fabricated bar rotor having similar temperature and speed operation ranges.

In an alternative embodiment, and after the casting process, the laminations at core end sections 110 and 114 are not machined. Although the portions of rotor bars 118 in end sections 110 and 114 have first shape 126 and the portions of rotor bars 118 in main body section 112 have second shape 128, the portions of rotor bars 118 in end sections 110 and 114 are constrained in the radially outward direction by the laminations. However, due to the differences in the geometric shapes of the bar portions, the portions of rotor bars 118 in end sections 110 and 114 may be more flexible than the portions of rotor bars 118 in main body section 112. Such a rotor therefore is believed to provide the cost advantages of a cast aluminum rotor, and may be able to operate at higher temperature and speed ranges than the known cast aluminum rotors.

Further, in yet another alternative embodiment for increasing the flexibility of the rotor bars, and rather than using two different types of laminations having radial openings with different geometric shapes, it is contemplated that one lamination type having radial openings with one geometric shape could be used to form the rotor core. In this configuration, the core end sections would be machined so that the rotor bar outer surfaces at the end sections are exposed and are not constrained in the radial outward direction in the end sections. Therefore, at the end sections, the portions of the rotor bars in the end sections may be more flexible than the portions of the rotor bars in the main body section. Such a rotor also is believed to provide the cost advantages of a cast aluminum rotor, and may be able to operate at higher temperature and speed ranges than the known cast aluminum rotors.

From the preceding description, it is evident that the objects of the invention are attained. Although embodiments of the invention have been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A rotor core, comprising;
   a substantially cylindrical main body portion, said body portion comprising first, second and third body sections, said first body section having an outer diameter less than an outer diameter of said second body section, and said third body section having an outer diameter less than said second body section outer diameter, said first and third body sections contiguous with, and extending from, said second body section;
   a plurality of radially arranged rotor bar slots extending entirely through said main body portion;
   a substantially planar first end;
   a substantially planar second end;
   a first end ring adjacent said first body portion at said substantially planar first end; and
   a second end ring adjacent said third body portion at said substantially planar second end.

2. A rotor core in accordance with claim 1 wherein said first and third body section diameters are approximately about equal.

3. A rotor core in accordance with claim 1 wherein said rotor bar slots in said second body section are closed slots.

4. A rotor core in accordance with claim 1 wherein said rotor bar slots in said second body section are open slots.

5. A rotor core in accordance with claim 1 wherein said rotor bar slots in said first, second, and third body sections have a same geometric cross-sectional shape.

6. A rotor core in accordance with claim 1 wherein said rotor bar slots in said first body section have a first geometric cross-section shape and said rotor bar slots in said second body section have a second geometric cross-sectional shape.

7. A rotor core in accordance with claim 6 wherein said rotor bar slots in said third body section have said first geometric cross-sectional shape.

8. A rotor core in accordance with claim 7 wherein said main body portion comprises a plurality of laminations.

9. A rotor core in accordance with claim 8 wherein said laminations are steel.

10. A rotor, comprising;
    a substantially cylindrical core having axially spaced apart first and second ends, a body portion between said ends, and a plurality of rotor bar slots extending through said body portion, said body portion comprising first, second and third body sections, said first body section having an outer diameter less than an outer diameter of said second body section, and said third body section having an outer diameter less than said second body section outer diameter, said rotor bar slots in said first body section have a first geometric cross-sectional shape and said rotor bar slots in said second body section have a second geometric cross-sectional shape, said rotor bar slots in said first and third body sections being open and said rotor bar slots in said second body section being closed;
    a plurality of rotor bars, each of said rotor bars extending through a respective one of said rotor bar slots;
    a first end ring at said first end of said rotor core, said first end ring adjacent said first body section and electrically connected to said rotor bars; and
    a second end ring at said second end of said rotor core, said second end ring adjacent said third body section and electrically connected to said rotor bars.

11. A rotor in accordance with claim 10 wherein said rotor bar slots in said third body section have said first geometric cross-sectional shape.

12. A rotor in accordance with claim 10 wherein said rotor bars and said first and second end rings are aluminum.

13. A rotor in accordance with claim 10 wherein said first and third body section diameters are approximately equal.

14. A rotor in accordance with claim 10 wherein said rotor core comprises a plurality of laminations.

15. A rotor in accordance with claim 14 wherein said laminations are steel.

16. A rotor in accordance with claim 10 wherein an outer diameter of said first end ring is approximately equal to an outer diameter of said first body section diameter.

17. A rotor in accordance with claim 16 wherein an outer diameter of said second end ring is approximately equal to said first end ring outer diameter.

18. A rotor, comprising;
   a substantially cylindrical core having axially spaced apart first and second ends, a body portion between said ends, and a plurality of rotor bar slots extending through said body portion, said body portion comprising first, second and third body sections, said first body section having an outer diameter less than an outer diameter of said second body section, and said third body section having an outer diameter less than said second body section outer diameter, said first and third body sections contiguous with, and extending from, said second body section, said rotor bar slots in said first and third body sections being open and said rotor bar slots in said second body section being closed;
   a plurality of rotor bars, each of said rotor bars extending through a respective one of said rotor bar slots;
   a first end ring at said first end of said rotor core, said first end ring adjacent said first body section and electrically connected to said rotor bars; and
   a second end ring at said second end of said rotor core, said second end ring adjacent said third body section and electrically connected to said rotor bars.

19. A rotor in accordance with claim 18 wherein said rotor bar slots in said first body section have a first geometric cross-sectional shape and said rotor bar slots in said second body section have a second geometric cross-sectional shape.

* * * * *